(12) United States Patent
Shaffer et al.

(10) Patent No.: US 7,224,775 B1
(45) Date of Patent: May 29, 2007

(54) SYSTEM AND METHOD FOR PROVIDING PRIORITIZED ACCESS TO A MESSAGING SYSTEM

(75) Inventors: Shmuel Shaffer, Palo Alto, CA (US); Joseph F. Khouri, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 430 days.

(21) Appl. No.: 09/751,757

(22) Filed: Dec. 29, 2000

(51) Int. Cl.
*H04M 1/64* (2006.01)

(52) U.S. Cl. .............................. 379/88.16; 379/142.05; 379/215.01; 379/243; 379/266.01; 711/158

(58) Field of Classification Search ................. 379/86, 379/88.01, 88.02, 88.04, 88.18, 88.19, 88.2, 379/88.21, 67.1, 88.24, 352, 93.24, 210.01, 379/214.01, 266.01, 265.14, 88.17, 88.16, 379/142.05, 144.01, 207.2, 211.02, 215.01, 379/243; 370/232, 352; 705/7; 711/158
See application file for complete search history.

(56) References Cited

U.S. PATENT DOCUMENTS

| | | | | |
|---|---|---|---|---|
| 5,117,451 A | * | 5/1992 | Ladd et al. | 379/88.26 |
| 5,600,710 A | * | 2/1997 | Weisser et al. | 379/88.19 |
| 5,920,846 A | * | 7/1999 | Storch et al. | 705/7 |
| 6,115,751 A | * | 9/2000 | Tam et al. | 709/240 |
| 6,160,883 A | | 12/2000 | Jackson et al. | 379/230 |
| 6,195,417 B1 | * | 2/2001 | Dans | 379/67.1 |
| 6,219,415 B1 | * | 4/2001 | Deutsch et al. | 379/215.01 |
| 6,233,318 B1 | | 5/2001 | Picard et al. | 379/88.17 |
| 6,301,349 B1 | * | 10/2001 | Malik | 379/211.02 |
| 6,324,271 B1 | * | 11/2001 | Sawyer et al. | 379/142.05 |
| 6,404,870 B1 | * | 6/2002 | Kia et al. | 379/144.01 |
| 6,404,878 B1 | | 6/2002 | Jackson et al. | 379/221.01 |
| 6,408,058 B1 | | 6/2002 | Lanet | 379/93.19 |
| 6,412,048 B1 | * | 6/2002 | Chauvel et al. | 711/158 |
| 6,456,699 B1 | * | 9/2002 | Burg et al. | 379/88.17 |
| 6,459,681 B1 | * | 10/2002 | Oliva | 370/232 |
| 6,493,445 B2 | * | 12/2002 | Garland et al. | 379/243 |
| 6,512,825 B1 | * | 1/2003 | Lindholm et al. | 379/266.01 |
| 6,519,333 B1 | * | 2/2003 | Malik | 379/207.02 |
| 6,529,500 B1 | * | 3/2003 | Pandharipande | 370/352 |
| 6,590,867 B1 | * | 7/2003 | Ash et al. | 370/236 |

* cited by examiner

*Primary Examiner*—Gerald Gauthier
(74) *Attorney, Agent, or Firm*—Baker Botts L.L.P.

(57) ABSTRACT

A method and system for providing prioritized access to a messaging system includes receiving at an access controller for a messaging system a request for connection by a user to the messaging system. The access controller determines whether the messaging system is available. The access controller further queues the request if the messaging system is not available.

32 Claims, 2 Drawing Sheets

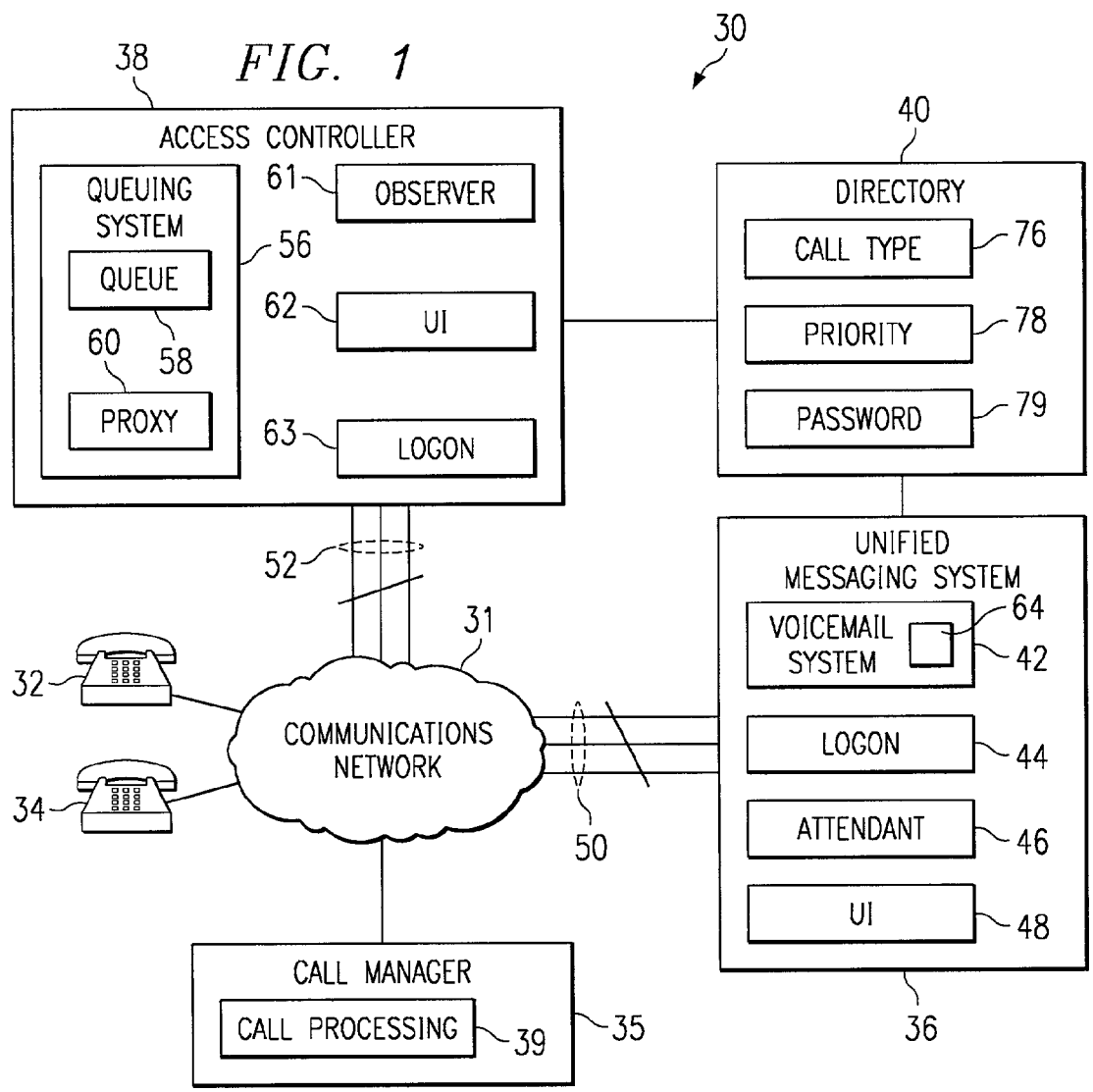

SYSTEM AND METHOD FOR PROVIDING PRIORITIZED ACCESS TO A MESSAGING SYSTEM

TECHNICAL FIELD OF THE INVENTION

The present invention relates generally to messaging systems, and more particularly, to a system and method for providing prioritized access to messaging systems.

BACKGROUND OF THE INVENTION

Voice mail systems are often used to record, store and retrieve voice messages. There are generally two types of voice mail systems; stand alone and integrated. An integrated voice mail system includes at least some degree of integration with a user's telephone and/or data network. Accordingly, a user may configure their telephone terminal to forward calls to the voicemail system, if a call is unanswered after a predetermined number of rings. Furthermore, users may be provided remote access to the voice mail system for message management and retrieval, over an internal or external network. User's are generally given access to a voice messaging system from any location having a telephone and/or internet enabled computer terminal.

Unified messaging, also referred to as integrated messaging, includes all of the capabilities described above, and may include many more. Such systems usually provide voice messaging, as well as fax and e-mail applications, consolidated into a single, remotely accessible system. Integrated servers collect and consolidate various types of messages for retrieval by a user. Such dial-in services often combine voice and data networks for simplified message management and retrieval.

Each of the systems described above include a finite number of ports for connection to a telecommunications network. During peak utilization hours, many users attempt to access their messages, and others attempt to leave new messages, simultaneously. Accordingly, a situation may ultimately be reached where all of the ports of the system are in use. After the system reaches its capacity, subsequent users trying to connect with the system receive a busy signal. In order to connect with the system, such users are forced to hang up and attempt to connect with the system at a later time. At the same time, callers attempting to leave a message for an unavailable party cannot be routed to the messaging system. Instead, the extension will continue to ring until the caller disconnects, or alternatively, the system will automatically disconnect the caller.

SUMMARY OF THE INVENTION

The present invention provides a system and method for providing prioritized access to messaging systems that substantially eliminate or reduce the problems and disadvantages associated with the previous methods and systems. In particular, access to messaging system resources are prioritized based upon user identity, called party, request type and/or other defined criteria.

In accordance with a particular embodiment of the present invention, a method and system for providing priority access to a messaging system includes receiving at an access controller for a messaging system a request for connection by a user to the messaging system. The access controller determines whether the messaging system is available. The access controller further queues the request if the messaging system is not available.

More specifically, in accordance with a particular embodiment of the present invention, a class of service (CoS) for the connection is determined. In this embodiment, the request is queued by the access controller based on the CoS. The CoS may be based on the identity of the calling party, called party, the type of the call and/or other suitable criteria.

A technical advantage of a particular embodiment of the present invention includes providing a system and method for prioritized access to a messaging system. In particular, a request for a connection is given priority based upon criteria including information regarding the identity of the user, a party with whom the user is trying to contact, and/or the type of the request for connection. Accordingly, priority may be given to particular users of the messaging system. Similarly, priority may be provided based upon the type of request for connection, including whether the user has elected to remain on hold or camp-on. Priority may also be provided based upon the type of request, including whether the user would like to leave and/or retrieve messages.

Another technical advantage of a particular embodiment of the present invention includes providing a mechanism to assign different priorities to users who wish to leave messages and users who wish to retrieve messages. Yet another technical advantage of a particular embodiment of the present invention includes providing a method and system for collecting login information and/or performing authentication processing at an access controller for a messaging system. As a result, on hold time is utilized and messaging system connection time reduced. Accordingly, the efficiency of the messaging system and the overall level of service are enhanced.

Other technical advantages of the present invention will be readily available to one skilled in the art from the following figures, descriptions, and claims.

BRIEF DESCRIPTION OF THE DRAWINGS

For a more complete understanding of the present invention and its advantages, reference is now made to the following descriptions, taken in conjunction with the accompanying drawings, in which:

FIG. 1 is a block diagram illustrating a communication network in accordance with one embodiment of the present invention;

FIG. 2 is a block diagram illustrating class of service (CoS) information for queuing a connection in the access controller of FIG. 1 in accordance with one embodiment of the present invention.

DETAILED DESCRIPTION OF THE INVENTION

Figure 3:
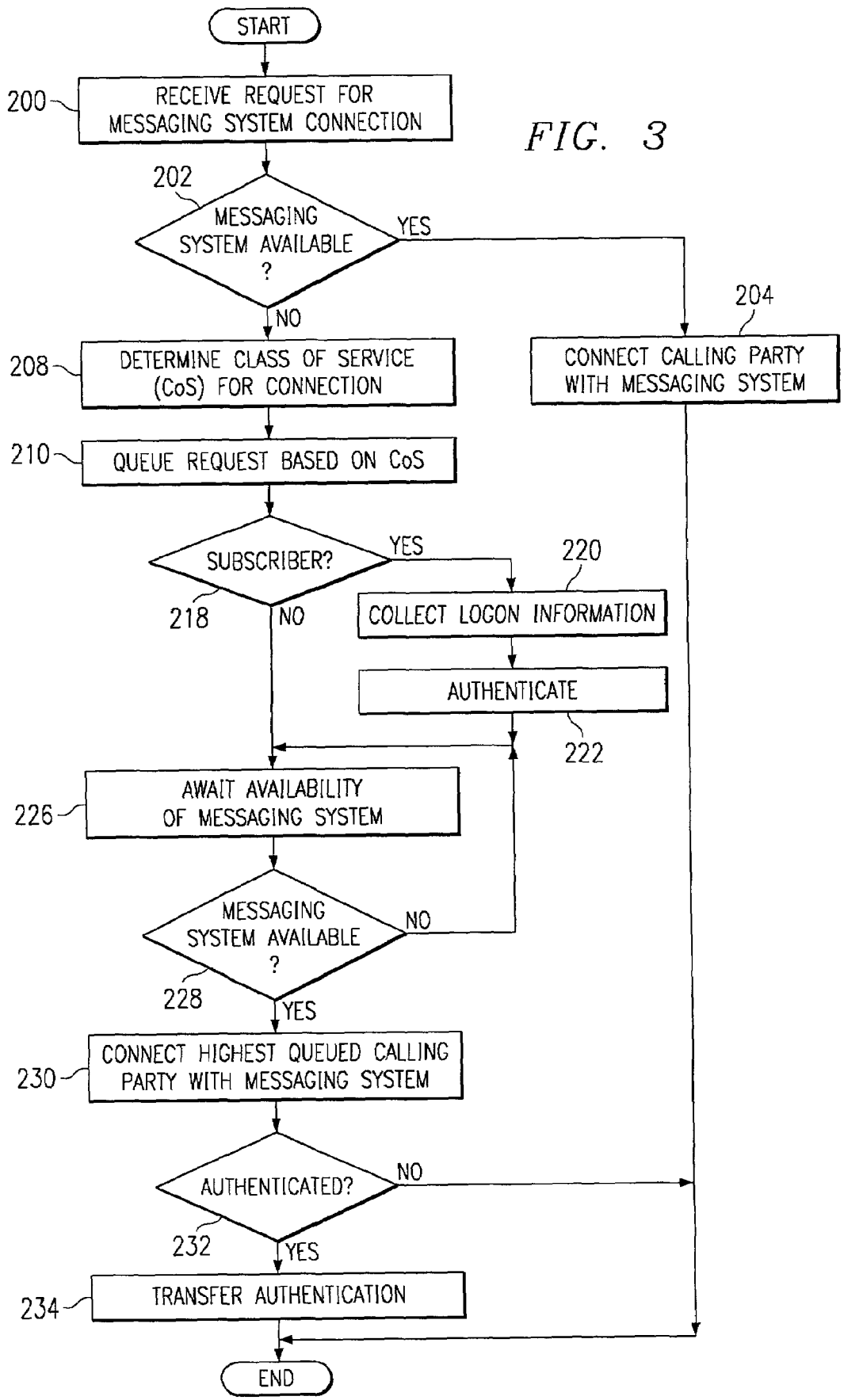
FIG. 3 is a flow diagram illustrating a method for providing prioritized access to a messaging system in accordance with one embodiment of the present invention.

FIG. 1 illustrates a communication network 30 including a plurality of terminal units 32 and 34 coupled with a call manager 35, a unified messaging system 36 and an access controller 38. Access controller 38 is also coupled with a directory module 40. Access controller 38 manages, prioritizes, and distributes calls destined for unified messaging system 36, and allows users of unified messaging system 36, including terminal units 32 and 34, to more efficiently utilize their time while waiting for ports or other suitable resources of unified messaging system 36 to become available.

Communication network 30 includes a telecommunication network 31 which couples terminal units 32 and 34, call manager 35, unified messaging system 36, and access controller 38. In alternative embodiments, communication network 30 may include any computer and/or communication network including, but not limited to the Internet, intranets, local area networks (LANs), wide area networks (WANs) or metropolitan area networks (MANs). Accordingly, terminal units 32 and 34 may include telephones, personal computers, laptops, personal digital assistants (PDAs), or any other devices capable of communication over a distributed network.

In the illustrated embodiment, call manager 35 is a PBX, a server or a class of servers. Call manager 35 includes call processing 39 which handles call set up, call signaling, call connection and call tear down within the telecommunication network 31. Call processing 39 directs calls intended for unified messaging system 36 to the access controller 38 for processing. In response to signaling from access controller 38, call processing 39 connects a caller to unified messaging system 36.

Unified messaging system 36 is used to provide message services to users of terminal units 32 and 34. Unified messaging system 36 includes a voicemail system 42. Voicemail system 42 provides users of unified messaging system 36 with a device to record, store, manage and retrieve telephone messages within a plurality of associated private voicemail accounts, or mailboxes. In particular embodiments, users of unified messaging system 36 include callers seeking to leave and/or retrieve messages from locations remote or local to unified messaging system 36. In other embodiments, voicemail system 42 may also include various other features available to users of unified messaging system 36. For example, users of voicemail system 42 have the ability to forward messages to other users of voicemail system 42, edit messages, add comments to messages, automatically respond to messages and/or deliver messages at predetermined times. Voicemail system 42 also allows messages to be tagged as "urgent", and priority handling of "urgent" messages is provided.

Voicemail system 42 may be integrated within a telephone system or network. Accordingly, additional services are available from voicemail system 42. For example, a users telephone may be programmed such that calls that remain unanswered after a predetermined number of rings are forwarded to voicemail system 42. Voicemail system 42 may also be preprogrammed such that users will be notified when they have a message(s) waiting. This may be accomplished by a flashing light on the users telephone, or a message may be delivered to the user via electronic mail, alphanumeric pager, or other electronic device.

In addition to the functionality of voicemail system 42, unified messaging system 36 includes a number of additional features. For example, users of unified messaging system 36 may use their telephone and/or computers to manipulate messages in the same manner as a cassette recorder. Messages can be played, fast forwarded, slowed down, copied, edited, etc. Unified messaging system 36 also provides for the integration of voice, fax, electronic mail, image and video all upon a single computer, or other terminal unit. Accordingly, a user of unified messaging system 36 may send, retrieve, and/or manage various messages in different formats from a single location.

Unified messaging system 36 includes a logon system 44. The logon system 44 collects identification and password information from users and authenticates the users for access to private accounts, mailboxes and other items of unified messaging system 36. The logon system 44 may also authenticate access privileges of subscribers to particular services of the unified messaging system 36.

Unified messaging system 36 also includes an automated attendant 46 to improve the efficiency and routing of incoming calls. Automated attendant 46 greets users of messaging system 36 with a prerecorded message, and allows users to select from a directory of services available from messaging system 36. Users are also provided the ability to opt out of unified messaging system 36 by pressing a predetermined key or keys.

A user interface 48 is also included with unified messaging system 36. User interface 48 automates the retrieval and processing of information by phone, in order to automate telephone based tasks. For example, user interface 48 provides a system with the ability to collect information from users of unified messaging system 36, through interactive voice responses, voice command recognition and/or digit collection. Therefore, user interface 48 increases the overall efficiency of unified messaging system 36 by allowing for the handling or routing of calls based upon information collected regarding each specific call.

In a particular embodiment, unified messaging system 36 may be associated with a particular organization. Accordingly, unified messaging system 36 may be located upon the premises of the organization. Callers trying to contact members of the organization may be directed to voicemail system 42 which will sort, manage and store the messages for retrieval by the members of the organization. Furthermore, members of the organization may be provided with access telephone numbers to communicate with system 36 from a remote location. After dialing into unified messaging system 36, users can collect their messages, forward messages to other members of the organization and/or create messages to other members of the organization.

Unified messaging system 36 is coupled with telecommunications network 31 using a plurality of communications links 50. In practice, every unified or other messaging system and/or voicemail system includes a predetermined capacity of ports or other connections to communications links, which cannot be exceeded. Also, users of unified messaging system 36 may be limited in the amount of communications links available for coupling unified messaging system 36 with a given network. The limit may be imposed by the processing capability of unified messaging system 36. Therefore, unified messaging system 36 can only handle a finite number of communication connections with network 31 before the capacity is reached. When unified messaging system 36 is at capacity, additional calls must be held elsewhere or additional callers will receive a busy signal.

In the illustrated embodiment of FIG. 1, terminal unit 34 has a private voicemail account 64 associated with voicemail system 42. Terminal unit 34 is also configured to transfer all calls to voicemail system 42 if the call is unanswered after two rings. If terminal unit 32 places a call to terminal unit 34 and terminal unit 34 is unavailable, the call will be transferred to voicemail system 42. The user of terminal unit 32 will be prompted to leave a message in voicemail account 64 of voicemail system 42, since terminal unit 34 is unavailable. However, if unified messaging system 36 has already exceeded its capacity, terminal unit 32 will not be able to connect with voicemail system 42 until unified messaging system 36 becomes available, such as when a communication link 50 or processing capacity becomes available. Similarly, if terminal unit 32 requests to connect with unified messaging system 36 directly when unified messaging system 36 is at capacity, in order to send, retrieve, or otherwise modify a message, the user will receive a busy signal.

Access controller 38 provides management of access to messaging resources which increases the capacity and efficiency of unified messaging system 36. In the illustrated embodiment, access controller 38 is implemented as a computer server remote from the unified messaging system. A plurality of communications links 52 couple access controller 38 with telecommunications network 31. In a particular embodiment, a secure signaling protocol is provided over links 50 and/or 52, between unified messaging system 36 and access controller 38. It will be understood that access controller 38 may be implemented on a server with unified messaging system 36, or a server with call manager 35.

In a particular embodiment of the present invention, requests for connection by a user with unified messaging system 36 are directed by call manager 35 to access controller 38. Access controller 38 immediately connects the user to unified messaging system 36 if the system 36 is initially available. When the unified messaging system 36 is not available, the access controller 38 queues to connection until the system 36 becomes available. There are many reasons why unified messaging system 36 may be unable to process a request for a connection. For example, unified messaging system 36 may be at capacity and unable to process any additional requests. In this case, rather than the user receiving a busy signal as discussed previously, the connection is held by access controller 38. Similarly, access controller 38 may hold connections if unified messaging system 36 is temporarily unavailable due to service, maintenance, or operating difficulty. Thus, in this embodiment, all calls bound for unified messaging system 36 are routed to access controller 38 for preliminary processing of the calls. Access controller 38 processes each call before forwarding the user to messaging system 36.

Access controller 38 includes a queuing system 56 including one or more queues 58. Queuing system 56 is operable to manage and distribute incoming calls and/or requests for connection with unified messaging system 36. In a particular embodiment, queuing system 56 will receive each request for a connection with unified messaging system 36 which unified messaging system 36 cannot immediately handle. Queuing system 56 maintains a connection with each terminal unit 32 and 34 having an outstanding request for a connection with unified messaging system 36. Queuing system 56 also determines the order in which requests for a connection with unified messaging system 36 will be processed.

One alternative for processing requests for connections with unified messaging system 36 is based upon the time at which the request was received by access controller 38. In other words, overflow requests for a connection with unified messaging system 36 may be queued in a first come-first served (FIFO) queue 58 and handled on that basis. Various other methods for prioritizing requests for connection will be described in more detail with regard to FIG. 2.

Accordingly, queuing system 56 may be used to queue, or hold, a request for a user connection until unified messaging system 36 becomes available. At such time as a request reaches a primary position within the queue 58, queuing system 56 connects the call with unified messaging system 36. A primary position within the queue 58 may include a first or highest priority position in the queue 58 or set of queues from which a connection will be selected when a communication link 50 of a port is available for connection.

There are many advantages to maintaining connections with outstanding requests until unified messaging system 36 becomes available. For example, users will not receive a busy signal when unified messaging system 36 reaches its capacity. Instead, each users request for a connection will be maintained and processed by queuing system 56 in the order received or based on other suitable criteria. This provides each user with a priority within a queue, rather than forcing the users to hang up and initiate another request in the future.

The queuing system 56 may queue a request by queuing the call, the request or an item corresponding to the call and/or request. In a particular embodiment, queuing system 56 may generate a proxy 60 to wait on the users behalf. This allows the user to break the connection with queuing system 56 while waiting for unified messaging system 36 to become available. Further information regarding proxy 60 is described in co-owned U.S. patent application entitled Call Hold Manager System and Method, Ser. No. 09/680,653, filed Oct. 6, 2000.

Access controller 38 includes observer 61 that monitors and observes the status of links 50 and/or the usage of unified messaging system 36 to determine whether the unified messaging system 36 is available. Observer 61 may also anticipate port availability based on usage patterns. Observer 61 reports to access controller 38 and queuing system 56 the current state of messaging system ports and/or port status changes.

Access controller 38 may also be equipped with additional components to increase its efficiency and simplify its use. For example, access controller 38 of FIG. 1 is equipped with a user interface 62 and logon system 63. User interface 62 and logon system 63 include similar features and functionality as user interface 48 and logon system 44, described above. Accordingly, access controller 38 may collect logon information and perform authentication while the caller is "on hold." Therefore, the teachings of the present invention may be used to transfer a portion of the intelligence (i.e., digit collection, voice response recognition authentication) typically associated with messaging systems to access controller 38 in order to increase the efficiency and expedite the handling of requests for connection with the messaging system. As unified messaging system 36 becomes available, login 63 transfers a password or a login token generated upon successful authentication to login 44.

Components of communication network 30, including unified messaging system 36 and access controller 38 and components thereof, are systems and devices implemented in hardware and/or software. Logic associated with such systems may be implemented in computer readable or other suitable media, such as field programmable gate array (FPGA), application specific integrated circuit (ASIC), digital signal processor (DSP) and other general or specific processors. For the purposes of this specification, any component, system and/or device which performs an action may do so by initiating, controlling and/or performing the action. Functionality associated with such systems, components and devices may be centrally located, or such functionality may be distributed between and among a plurality of components, systems and devices.

FIG. 2 illustrates information which may be collected by access controller 38 in order to manage and distribute requests for a connection with unified messaging system 36, more efficiently. For example, queuing system 56 of access controller 38 may use the telephone number assigned to the terminal unit seeking the connection with unified messaging system 36 in order to establish priority in a given queue. If the caller telephone number 66 is determined to be internal to a network of interest, the caller may be provided with priority access to resources as opposed to a user calling from outside of the network. In this manner, priority may be provided to calls internal to an organization. Alternatively, priority may be provided to outside callers, or customers.

Similarly, queuing system 56 may maintain a database with specific telephone numbers requiring priority access to the network. For example, the home telephone numbers of executives within an organization and/or important customers or clients may receive priority. In a particular embodiment, the called party telephone number 68 may be used to establish priority within the queue 58. In order to accomplish this, queuing system 56 may maintain a database of telephone numbers within the network which require priority access. For example, an emergency hotline may be established by the organization which requires immediate access from users outside the network. Alternatively, priority may be given to incoming calls directed to a specific executive of the company or branch of the organization, for example, a sales department. In a particular embodiment, directory module 40 may be used to store such databases, as will be described later in more detail.

Priority position within the queue 58 may also be based upon decisions made by the user. For example, the type of call 70 awaiting unified messaging system 36 may determine the priority within the queue 58. In this embodiment, if the user indicates that she would like to check messages on unified messaging system 36, she may be given a different priority than a user attempting to leave a message. Alternatively, if the user elects to be placed on hold and/or remain on the line in order to access other resources, their position in the queue may be advanced ahead of another user who elected to "camp on" and be notified when the unified messaging system 36 becomes available.

In another embodiment, a database may be established in, or remote from the server, to maintain specific caller priorities 72. Specific callers may be identified by the caller's telephone number 66 or the caller may be asked to provide an access code or user ID. In this embodiment, the database may identify the caller in order to establish their priority within the queue. Similarly, queuing system 56 may maintain a database including called party priorities 74. The called party priority 74 may be established using the called party telephone number 68 or another method operable to identify the called party and their given Class of Service (CoS) or priority within the organization.

Directory module 40 of FIG. 1 is used to store information regarding caller telephone numbers 66, called party telephone numbers 68, call type 70, caller priority 72 and/or called party priority 74. Directory module 40 is also used to store authentication information for use by unified messaging system 36 and access controller 38. For example, call type module 76 is used to define various call types 70 and information regarding their priority in the queue 58. Call type module 76 includes classifications of calls including "create a message," "retrieve a message", "remain on hold", and/or "camp-on". Priority module 78 includes information regarding the priority 72 and/or 74 of caller telephone numbers 66, called party telephone numbers 68 and/or user identification numbers. Password module 79 includes passwords and/or user identities or other authentication information. In a particular embodiment, directory module 40 includes databases for the storage of information and/or processors operable to process such information.

Therefore, for some embodiments, directory module 40 establishes the priority for handling incoming requests, and/or overflow requests, for connection with unified messaging system 36. However, access controller 38 may also be used in lieu of and/or in addition to directory module 40 to establish the priority of the request for connection with any given queue. Such priority may be established by information regarding the originator of the request for connection (i.e., internal to the network, external to the network, caller telephone number 66, called party telephone number 68, user identification number, password, etc. . . . ).

FIG. 3 is a flow diagram illustrating a method for providing prioritized access to the unified or other messaging system in accordance with one embodiment of the present invention. The method begins at step 200 in which a request for a connection by a user with a messaging system is received. As previously described, the request for the connection is routed by call manager 35 and received by access controller 38.

At step 202, the availability of the messaging system is determined. In one embodiment, observer 61 determines availability of ports on the messaging system based on the status of links 50. In this embodiment, the messaging system is available if at least one port is not actively in use and no connections are currently queued by queuing system 56. Conversely, the messaging system is not available if all ports are currently active or if one or more connections are currently queued for the available ports. If the messaging system is initially available, the Yes branch of step 202 leads to step 204 and the user is immediately, without queuing, connected with the messaging system. If the messaging system is not available, the No branch of step 202 leads to step 208.

At step 208, the queuing system 56 determines the CoS for the connection based on information collected regarding the request for connection. Information collected by system 56 may include the users telephone number (caller ID), the called party's telephone number, the user's identification number, the user's password, and/or the type of connection requested (i.e., leave a message(s), retrieve a message(s), etc. . . . ), as described above.

Next, at step 210, the request is queued based on the CoS. Requests may be queued in a single queue or in two or more queues. For example, queuing system 56 may include a single queue with requests ranked by priority, low and high priority queues with requests in each queue ordered in a FIFO basis, or high, medium and low priority queues with requests in each queue ordered in a FIFO or other suitable basis. The different queues may be logically or physically distinct. For a high priority and low priority queuing system, requests for connections may be queued into the high priority queue if either the CoS of the calling party, called party or call type is high.

Proceeding to step 218, if the calling party is a subscriber having a private account or mailbox, the access controller 38 collects logon information at step 220 and authenticates the subscriber at step 222. Accordingly, the subscriber is authenticated while waiting on availability of the messaging system to minimize the time the user will need to spend once connected to the messaging system. Step 222 leads to step 226 in which the user awaits availability of the messaging system. If the user is not a subscriber, the No branch of step 218 also leads to step 226 in which the user awaits availability of the messaging system.

While awaiting availability of the messaging system, the user is given the option to access additional network resources. Network resources available to the user may include music, advertisements, announcements, account balances, internet access and/or other access to another messaging system. The user may select a network resource from a menu provided by the access controller 38. In particular embodiments, the selection of the resource may be determined by voice recognition and/or digit collection by the access controller 38.

At step 228, the availability of the messaging system is established. If the messaging system is not available, the server continues to await the availability of the messaging system at step 226. Finally, when a port of the messaging system becomes available, the highest queued user in the highest priority queue having a request is connected with the messaging system at step 230.

At step 232, if the user was previously authenticated by the access controller 38 while the request was queued, the authentication is transferred to the messaging system at step 234. Thus, authentication need not be again performed by the messaging system. Step 234 leads to the end of the process by which access to the messaging system is provided on a prioritized basis.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for prioritized access to a messaging system, comprising:
    receiving, at an access controller for a messaging system, a request by a user of the messaging system to be connected with the messaging system;
    determining whether the messaging system is available;
    if the messaging system is available, establishing a telecommunications connection between the user and the messaging system;
    if the messaging system is not available:
        queuing the request; and
        maintaining a telecommunications connection between the access controller and the user while the request is queued;
    determining a class of service (CoS) for the connection;
    queuing the request based on the CoS;
    wherein the CoS includes a priority associated with a called party; and
    wherein the priority associated with the called party is established according to a telephone number of the called party.

2. The method of claim 1, further comprising immediately connecting the user with the messaging system if the messaging system is initially available.

3. The method of claim 1, wherein the CoS includes a priority associated with the user.

4. The method of claim 3, wherein the priority associated with the user is established according to an identification number of the user.

5. The method of claim 4, further comprising:
    determining a telephone number of the user, at the access controller; and
    wherein the identification number corresponds to the telephone number of the user.

6. The method of claim 1, wherein the CoS includes a priority associated with a type of the request for connection.

7. The method of claim 6, wherein the type of the request for connection is selected from the group consisting of an internal network request to review a message, an internal network request to leave a message, an external network request to review a message and an external network request to leave a message.

8. The method of claim 1, further comprising queuing the request based on a time at which the request for connection is received.

9. The method of claim 1, wherein the messaging system comprises a voicemail system.

10. The method of claim 1, further comprising connecting the user to the messaging system when the messaging system becomes available and the request is at a primary position in a queue of the access controller.

11. An access controller for a messaging system, comprising:
    means for receiving, at an access controller for a messaging system, a request by a user of the messaging system to be connected with the messaging system;
    means for determining whether the messaging system is available;
    means for establishing a telecommunications connection between the user and the messaging system, if the messaging system is initially available;
    means for queuing the request at the access controller and maintaining a telecommunications connection between the user and the access controller, if the messaging system is not available;
    means for determining a class of service (CoS) for the connection;
    means for queuing the request based on the CoS;
    wherein the CoS includes a priority associated with a called party; and
    wherein the priority associated with the called party is established according to a telephone number of the called party.

12. The access controller of claim 11, further comprising means for immediately connecting the user with the messaging system if the messaging system is initially available.

13. The access controller of claim 11, wherein the CoS includes a priority associated with the user.

14. The access controller of claim 13, wherein the priority associated with the user is established according to an identification number of the user.

15. The access controller of claim 14, further comprising:
    means for determining a telephone number of the user; and
    wherein the identification number corresponds to the telephone number of the user.

16. The access controller of claim 11, wherein the CoS includes a priority associated with a type of the request for connection.

17. The access controller of claim 16, wherein the type of the request for connection is selected from the group consisting of an internal network request to review a message, an internal network request to leave a message, an external network request to review a message and an external network request to leave a message.

18. The access controller of claim 11, further comprising means for queuing the request based on a time at which the request for connection is received.

19. The access controller of claim 11, wherein the messaging system comprises a voicemail system.

20. The access controller of claim 11, further comprising means for connecting the user to the messaging system when the messaging system becomes available and the request is at a primary position in a queue of the access controller.

21. A system for prioritized access to a messaging system, comprising:
    logic encoded in media; and
    the logic operable to:

receive a request for connection by a user to a messaging system;
determine whether the messaging system is available; and
queue the request and maintain a telecommunications connection with the user while the request is queued, if the messaging system is not available;
establish a telecommunications connection between the user and the messaging system, if the messaging system is initially available;
determine a class of service (CoS) for the connection and to queue the request based on the CoS;
wherein the CoS includes a priority associated with a called party; and
wherein the priority associated with the called party is established according to a telephone number of the called party.

22. The system of claim 21, the logic further operable to immediately connect the user with the messaging system if the messaging system is initially available.

23. The system of claim 21, wherein the CoS includes a priority associated with the user.

24. The system of claim 23, wherein the priority associated with the user is established according to an identification number of the user.

25. The system of claim 24, the logic further operable to determine a telephone number of the user, wherein the identification number corresponds to the telephone number of the user.

26. The system of claim 21, wherein the CoS includes a priority associated with a type of the request for connection.

27. The system of claim 26, wherein the type of the request for connection is selected from the group consisting of an internal network request to review a message, an internal network request to leave a message, an external network request to review a message and an external network request to leave a message.

28. The system of claim 21, the logic further operable to queue the request based on a time at which the request for connection is received.

29. The system of claim 21, wherein the messaging system comprises a voicemail system.

30. The system of claim 21, the logic further operable to connect the user to the messaging system when the messaging system becomes available and the request is at a primary position in a queue of the access controller.

31. A method for prioritized access to a messaging system, comprising:
receiving at an access controller remote from a messaging system a request for connection by a user to the messaging system;
determining at the access controller whether ports of the messaging system are available;
queuing the request at the access controller if a port of the messaging system is not available;
authenticating the user for access to the messaging system while the request is queued;
establishing a telecommunications connection between the user and the messaging system when a port of the messaging system becomes available and the request is at a primary position in a queue of the access controller;
queuing the request based on a class of service (CoS) for the connection;
wherein the CoS includes a priority associated with a called party; and
wherein the priority associated with the called party is established according to a telephone number of the called party.

32. The method of claim 31, further comprising transferring a login token generated by authentication from the access controller to the messaging system.

* * * * *